United States Patent
Sharma et al.

(10) Patent No.: US 9,765,205 B2
(45) Date of Patent: Sep. 19, 2017

(54) MACROPHYTE-BASED BIOPLASTIC

(75) Inventors: Suraj Sharma, Bogart, GA (US); Ryan W. Hunt, Athens, GA (US); Mark Ashton Zeller, Bogart, GA (US)

(73) Assignee: Algix, LLC, Bogart, GA (US)

( * ) Notice: Subject to any disclaimer, the term of this patent is extended or adjusted under 35 U.S.C. 154(b) by 1173 days.

(21) Appl. No.: 13/594,680

(22) Filed: Aug. 24, 2012

(65) Prior Publication Data

US 2013/0220173 A1    Aug. 29, 2013

Related U.S. Application Data

(60) Provisional application No. 61/526,814, filed on Aug. 24, 2011.

(51) Int. Cl.

| | |
|---|---|
| *C08L 97/02* | (2006.01) |
| *C08L 1/00* | (2006.01) |
| *C08L 89/00* | (2006.01) |
| *C08L 1/12* | (2006.01) |
| *C08L 1/10* | (2006.01) |
| *C08L 101/16* | (2006.01) |

(52) U.S. Cl.
CPC .................. *C08L 1/00* (2013.01); *C08L 1/10* (2013.01); *C08L 1/12* (2013.01); *C08L 89/00* (2013.01); *C08L 97/02* (2013.01); *C08L 101/16* (2013.01); *C08L 2666/26* (2013.01)

(58) Field of Classification Search
CPC ...... C08L 97/02; C08L 99/00; C08L 2666/26; C08L 2201/06; C08L 89/00; C08L 1/00; C08L 1/10; C08L 1/12; C08K 13/08; C08K 2201/019; C08K 2201/005; C08J 5/045; C08J 2300/16
See application file for complete search history.

(56) References Cited

U.S. PATENT DOCUMENTS

| | | | |
|---|---|---|---|
| 4,454,259 A | 6/1984 | Reischl | |
| 4,820,749 A * | 4/1989 | Beshay | 523/203 |
| 5,279,745 A | 1/1994 | Jeffers | |
| 5,310,486 A | 5/1994 | Green | |
| 5,382,285 A | 1/1995 | Morrison | |
| 5,654,103 A | 8/1997 | Troadec | |
| 5,658,622 A | 8/1997 | Berlin | |
| 5,779,960 A | 7/1998 | Berlowitz-Tarrant | |
| 5,981,631 A * | 11/1999 | Ronden et al. | 524/13 |
| 6,313,105 B1 | 11/2001 | Bengs | |
| 6,323,265 B1 | 11/2001 | Bengs | |
| 6,793,675 B2 | 9/2004 | Shapiro | |
| 6,942,829 B2 * | 9/2005 | Drabeck et al. | 264/176.1 |
| 7,265,188 B2 | 9/2007 | Autran | |
| 7,288,196 B2 | 10/2007 | Jensen | |
| 7,576,147 B2 | 8/2009 | Drzal | |
| 7,888,540 B2 | 2/2011 | Deluga | |
| 7,923,003 B2 | 4/2011 | Speitling | |
| 7,951,237 B2 | 5/2011 | Zikeli | |

| | | |
|---|---|---|
| 2003/0191210 A1 | 10/2003 | Autran |
| 2008/0009055 A1 | 1/2008 | Lewnard |
| 2009/0081465 A1 | 3/2009 | Morgenstern |
| 2009/0126260 A1 | 5/2009 | Aravanis |
| 2009/0163620 A1 | 6/2009 | Sumanam |
| 2009/0197994 A1 | 8/2009 | Han |
| 2009/0318596 A1 | 12/2009 | Fu |
| 2010/0021968 A1 | 1/2010 | Hu |
| 2010/0120643 A1 | 5/2010 | Brown |
| 2010/0159170 A1 | 6/2010 | Wang |
| 2010/0240860 A1 | 9/2010 | Abraham |
| 2010/0267925 A1 | 10/2010 | Abraham |
| 2010/0272940 A1 | 10/2010 | Shi |
| 2010/0279354 A1 | 11/2010 | DeCrecy |
| 2010/0286299 A1 | 11/2010 | Casati |
| 2010/0297436 A1 | 11/2010 | Mahan |
| 2010/0297714 A1 | 11/2010 | Ju |
| 2010/0297749 A1 | 11/2010 | Aravanis |
| 2011/0009515 A1 | 1/2011 | Casati |
| 2011/0086215 A1 | 4/2011 | Casati |
| 2011/0086949 A1 | 4/2011 | Mentink |
| 2011/0124762 A1 | 5/2011 | Obi |
| 2011/0217748 A1 | 9/2011 | Costas |
| 2011/0223644 A1 | 9/2011 | Kodukula |
| 2011/0229698 A1 | 9/2011 | Rasmussen |
| 2011/0263886 A1 | 10/2011 | Kale |

FOREIGN PATENT DOCUMENTS

| | | |
|---|---|---|
| CN | 1309183 | 8/2001 |
| CN | 102212214 | 10/2011 |

(Continued)

OTHER PUBLICATIONS

Senna et al, "Compatibilization of lew-density polyethylene/plasticized starch blends by reactive compounds and electron beam radiation irradiation", Polymer Composites (2008) pp. 1137-1144.*
Klyosov, Wood-Plastic Composites, (2007) pp. 84-86, 166-168.*
Wypych, Handbook of Plasticizers, Chapter 11:Plasticizers USe and Selection for Specific Polymers, (2004).*
Abo Bakr et al, Isolation and chemical evaluation fo protein from water hyacinth, Qual Plant Plant Foods Hum Nutr, 354 (1984) pp. 67-73.*
Zhang et al., "Synthesis and characterization of a novel blend of polypropylene with Chlorella", J. Mater. Chem., 2000, pp. 2666-2672.
Iannace et al., "Biocomposites Based on Sea Algae Fibers and Biodegradable Thermoplastic Matrices", J. App. Science, vol. 73, pp. 583-592 (1999 John Wiley & Sons, Inc.)

(Continued)

*Primary Examiner* — David M Brunsman
(74) *Attorney, Agent, or Firm* — Roger D. Emerson; Emerson, Thomson & Bennett, LLC (57) ABSTRACT

A bioplastic composition may contain certain biodegradable and renewable components. In some examples, the bioplastic composition includes at least one kind of aquatic macrophyte biomass, which may contain a native composition of protein and carbohydrates, in a blend with one or more types of biodegradable or durable thermoplastic polymers. The aquatic macrophyte composition may provide a balance of both polymeric and reinforcing properties to the blended bioplastic not typically exhibited by terrestrial feedstock such as soy meal or corn starch. Such a bioplastic composition may be formed into molded articles using extrusion, injection molding, compression molding, or the like.

36 Claims, 6 Drawing Sheets

(56) References Cited

FOREIGN PATENT DOCUMENTS

| | | |
|---|---|---|
| DE | 4027786 | 4/1992 |
| EP | 2380731 | 10/2011 |
| GB | 2420265 | 5/2006 |
| JP | 7267253 | 10/1995 |
| JP | 8187085 | 7/1996 |
| JP | 8275793 | 10/1996 |
| JP | 10191992 | 7/1998 |
| JP | 2005023262 | 1/2005 |
| KR | 20110103272 | 9/2011 |
| WO | 2008050945 A1 | 5/2008 |
| WO | 2009142765 | 11/2009 |
| WO | 2010104562 | 9/2010 |
| WO | 2010120992 | 10/2010 |
| WO | 2010124030 | 10/2010 |
| WO | 2010136725 | 12/2010 |
| WO | 2010151431 | 12/2010 |
| WO | 2011014507 | 2/2011 |
| WO | 2011080623 | 7/2011 |
| WO | 2011102841 | 8/2011 |
| WO | 2011103428 | 8/2011 |
| WO | 2011116252 | 9/2011 |
| WO | 2011117549 | 9/2011 |
| WO | 2011130497 | 10/2011 |
| WO | 2011130501 | 10/2011 |
| WO | 2012117414 | 9/2012 |
| WO | 2012117415 | 9/2012 |

OTHER PUBLICATIONS

Barghini et al., "Poly-(E-caprolactone) (PCL) and poly(hydroxybutyrate) (PHB) blends containing seaweed fibers: Morphology and thermal-mechanical properties", Journal of Polymer Science, Part A: Polymer Chemistry, v 48, n 23, p. 5282-5288, Dec. 1, 2010; ISSN: 0887624X Publisher: John Wiley and Sons Inc [Abstract].

Katsaros et al., "Preparation and characterization of novel poly-(vinyl alcohol)-Zostera flakes composites for packaging applications", Composites Part B (Engineering), v 38, n 3, 398-404, Apr. 2007, [Abstract].

Sim et al., "Dynamic mechanical and thermal properties of red algae fiber reinforced poly(lactic acid) biocomposites", Macromolecular Research, v 18, n 5, p. 489-495, May 2010 ISSN: 15985032 Publisher: Polymer Society of Korea [Abstract].

Chiellini, et al., "Biodegradable thermoplastic composites based on polyvinyl alcohol and algae" Biomacromolecules, v 9, n 3, p. 1007-1013, Mar. 2008 ISSN: 15257797 Publisher: American Chemical Society [Abstract].

Lee et al, "Use of red algae fiber as reinforcement of biocomposite" Palpu Chongi Gisul/Journal of Korea Technical Association of the Pulp and Paper Industry, v 40, n 1, p. 62-67, 2000, ISSN: 02533200 Publisher: Korean Technical Assoc. of the Pulp and Paper Industry [Abstract].

Madera-Santana et al., "Preparation and characterization of biodegradable agar/poly(butylene adipateco-terephatalate) composites", Polymer Engineering and Science, v 49, n 6, p. 1117-1126, Jun. 2009 ISSN: 00323888 Publisher: John Wiley and Sons Inc. [Abstract].

Khanolkar et al, "Filamentous algae as a filler in synthetic and biodegradable polymers", Annual Technical Conference—ANTEC, Conference Proceedings, v 2, p. 2120-2124, 1995; Conference: Proceedings of the 53rd Annual Technical Conference. Part 1 (of 3), May 7, 1995-Oct. 11, 1995; Publisher: Soc of Plastics Engineers [Abstract].

Yu et al., "Functional, physiochemical, and rheological properties of duckweed (*Spirodela polyrhiza*) protein", Wang, Donghai Transactions of the ASABE, v 54, n 2, p. 555-561, Mar.-Apr. 2011 ISSN: 00012351 Publisher: American Society of Agricultural and Biological Engineers [Abstract].

Li et al., "Well-ordered structure and phase transition behaviors of a Reversed Duckweed polymeric Langmuir-Blodgett film studied by Fourier transform infrared spectroscopy and small-angle X-ray diffraction", v 14, n 2, p. 423-428, Jan. 20, 1998 ISSN: 07437463 Publisher: ACS [Abstract].

International Search Report and Written Opinion for PCT/US2012/052380, dated Dec. 13, 2012, 9 pages.

Myrtha Karina, et al., "Physical and Mechanical Properties of Natural Fibers Filled Polypropylene Composites and Its Recyle," Journal of Biological Sciences, vol. 7 (2): 2007, pp. 393-396.

Surpi, A.G., et al., "Effect of Treated and Untreated Filler Loading on the Mechanical, Morphological, and Water Absorption Properties of Water Hyacinth Fibers-Low Density Polyethylene Composites," Journal of Physical Science, vol. 20 (2), 2009, pp. 85-96.

* cited by examiner

MACROPHYTE-BASED BIOPLASTIC

This application claims the benefit of U.S. Provisional Application No. 61/526,814, filed Aug. 24, 2011, the entire contents of which are incorporated herein by reference.

TECHNICAL FIELD

This disclosure relates to relates to polymeric materials and, more particularly, to polymeric materials that include a macrophyte biomass.

BACKGROUND

In our modern day consumer society plastics have dominated the market as the premier material for most applications including packaging. This phenomenon is not completely unwarranted since conventional plastics are strong while maintaining a low weight, and offer resistance to degradation by water, chemicals, sunlight, and bacteria, as well as providing electrical and thermal insulation. All of these attributes make conventional plastics versatile for many applications; however they also come with environmental concerns. HIPS (High Impact Polystyrene), a commonly used plastic polymer uses 99.8 GJ of energy to produce 1,000 kilograms of resin coming mostly from natural gas as the energy source. This resource consumption is further inflated since conventional plastics are produced from crude oil, an increasingly diminishing resource, as a chemical precursor in this energy-costly process that yields HIPS resin. Beyond these consumption issues, the process of resin production further hinders the environment by producing waste products that enter the air, water, and the ground. Some of these waste products are known toxins and other damaging compounds that can leach out over time leading to ground water reservoir contamination. Furthermore, after production, the same properties that make conventional plastics attractive for commercial applications also produce further environmental costs by preventing biodegradation which increases the demand and size of landfills to facilitate the increasing amounts of plastic entering the municipal solid waste stream.

One solution to these problems is recycling plastics, which can reduce the filling of landfills and therefore leaching of chemicals by extending the use of a material. However, this has inherent energy consumption of its own. A study of packaging materials produced from HIPS showed that 18.9 MJ was required to produce 1 kilogram of recycled material, a cost that was approximately 23.5% the cost of producing the same product from raw materials. So while recycling does dramatically reduce the environmental cost of producing virgin plastic materials it also has its own environmental vices. These problems make conventional plastics no longer a sustainable solution in applications like packaging and short-term use products in which large quantities of plastic materials are produced and disposed. It would be desirable if there was a material that provided plastic-like properties without having the environmental impact associated with typical plastics.

SUMMARY

In general, this disclosure is directed to a bioplastic composition that includes a macrophyte biomass material combined with a thermoplastic polymer. The macrophyte biomass material may be a dried (e.g., dewatered) macrophyte harvested from an aquatic culture. Example macrophyte materials include, but are not limited to, duckweed, water fern, water lettuce, water hyacinth, water milfoil, pond weed, southern naiad, water weeds, horn wort, water lily, pond lily, water willow, broadleaf arrowhead, orontium, and hydrilla. The thermoplastic polymer may be a synthetic thermoplastic polymer formed from a variety of renewable or nonrenewable monomer sources, and may or may not be biodegradable. Additionally or alternatively, the thermoplastic polymer may be a natural polymer, e.g., generated from animal renderings or plants. In combination, the macrophyte biomass material, the thermoplastic polymer, and other desired additives may provide a robust bioplastic composition that can be formed into numerous different products. Example products that can be formed from the bioplastic compositions described herein include, but are not limited to, agricultural films, horticultural containers and products, packaging containers and films, automotive parts, carpet and flooring components, building materials, electrical components and housings, electronic device casings, and paint and coating containers.

A macrophyte-based composition as described in this disclosure may exhibit properties similar to a traditional plastic composition formed from non-renewable petrochemical feedstocks yet be formed from renewable materials at lower cost and lower environmental impact than the petrochemical feedstocks. For example, the macrophyte-based composition may incorporate the macrophyte biomass as a low-cost, non-petroleum-based feedstock yet still exhibit the performance characteristics demanded by many plastic consumers. In contrast to some biomass materials that deteriorate the performance of a thermoplastic polymer when incorporated with the polymer, macrophyte biomass materials have been identified as suitable feedstocks for use in the formation of thermoplastic compositions. Without being bound by any particular theory, it is believed that the composition and structure of the macrophyte biomass including, e.g., the composition and structure of the natural protein molecules in the biomass, enhance the bulk properties of the resultant bioplastic composition incorporating the macrophyte biomass. Rather than functioning as a mere filler in the higher-value thermoplastic polymer, the macrophyte biomass can complement and enhance the properties of the thermoplastic polymer.

Although the bioplastic composition can be prepared using a variety of different techniques, in some examples, the composition is prepared by direct extrusion compounding of finely milled macrophyte biomass powders with thermoplastic polymer powders so as to produce a blended thermoplastic resin. In subsequent use, the composition can be processed into a desired final structure, such as molded or extruded into three-dimensional articles of forms, films, fibers, and non-woven materials.

In one example, a bioplastic composition is described that includes a macrophyte biomass and a thermoplastic polymer. According to the example, the macrophyte biomass comprises greater than 5 weight percent of the bioplastic composition and the thermoplastic polymer comprises less than 95 weight percent of the bioplastic composition.

In another example, a bioplastic composition is described that consists essentially of a macrophyte biomass ranging from approximately 10 weight percent to approximately 85 weight percent of the bioplastic composition and a thermoplastic polymer ranging from approximately 90 weight percent to approximately 15 weight percent of the bioplastic composition. According to the example, the macrophyte biomass defines particle sizes ranging from approximately 1 micrometer to approximately 300 micrometers, and the macrophyte biomass is homogenously admixed with the thermoplastic polymer.

In another example, a method is described that include mixing a macrophyte biomass with a thermoplastic polymer so as to form a bioplastic composition. According to the example, mixing the macrophyte biomass with the thermoplastic polymer includes mixing an amount of macrophyte biomass with an amount of thermoplastic polymer so that the macrophyte biomass comprises greater than 5 weight percent of the bioplastic composition and the thermoplastic polymer comprises less than 95 weight percent of the bioplastic composition.

In another example, a method is described that includes forming an article from a bioplastic composition. According to the example, the bioplastic composition includes a macrophyte biomass and a thermoplastic polymer, the macrophyte biomass comprising greater than 5 weight percent of the bioplastic composition, and the thermoplastic polymer comprising less than 95 weight percent of the bioplastic composition.

Articles formed from the bioplastic compositions according to the disclosure are also described. Such articles may be formed by extrusion, injection or compression molding, casting films, extruding fibers or filaments, and include both woven and non-woven structures.

The details of one or more examples are set forth in the accompanying drawings and the description below. Other features, objects, and advantages will be apparent from the description and drawings, and from the claims.

DETAILED DESCRIPTION

The present disclosure provides, in some examples, for macrophyte-based compositions that exhibit thermoplastic behavior. The compositions may include macrophyte biomass materials mixed with thermoplastic polymers and other additives to define bioplastic compositions. The natural compounds in the macrophyte biomass materials, such as the natural protein and carbohydrate polymers in the macrophyte biomass materials, may combine with the thermoplastic polymers and other additives to produce a composite composition that exhibits a balance of polymeric and reinforcing properties acceptable for most plastic material applications.

In contrast to plastic compositions made from non-renewable feedstocks and renewable feedstocks derived from edible food sources, the macrophyte biomass in the macrophyte-based composition may be readily regenerated from environmentally sustainable sources. For example, the macrophyte biomass materials may be harvested from wastewater collection ponds, natural water sources such as ponds, lakes, and streams, and commercial cultivation ponds, among other sources. After harvesting, the macrophyte materials can be dewatered, processed into smaller particles, and blended with thermoplastic polymers to produce the bioplastic composition. Depending on the end application, the bioplastic composition can then be molded, extruded, shaped, coated, dispersed, or otherwise utilized for any desirable applications.

A macrophyte suitable for use in the bioplastic composition may be a plant that grows in an aquatic (e.g., nonterrestrial) environment. The term "Macrophyte" as used herein refers generally to a macroscopic fresh or brackish water aquatic plant that is comprised of multi-cellular specialized tissues with highly differentiated forms. Macrophytes include aquatic angiosperms (flowering plants), pteridophytes (ferns), and bryophytes (mosses, hornworts and liverworts).

In some examples, the macrophyte biomass (which may also be referred to as a biomeal) used in the bioplastic composition is a biomass that includes (or, optionally, consists or consists essentially of) a macrophyte within the genus *Lemna, Spirodela, Wolffia, Wolffiella, Azolla, Salvinia, Myriophyllum, Eichhornia, Hydrilla, Nymphaea, Nymphoides, Elodea, Ceratophyllum, Najas, Potamogeton, Nuphar, Justicia, Sagittaria, Orontium, Pistia*, and combinations thereof. For example, the macrophyte biomass may include (or, optionally, consist or consist essentially of) duckweed, water fern, water lettuce, water hyacinth, water milfoil, pond weed, southern naiad, water weeds, horn wort, water lily, pond lily, water willow, broadleaf arrowhead, orontium, hydrilla, and combinations thereof. In one example, the macrophyte biomass includes (or, optionally, consists or consists essentially of) duckweed.

Duckweed, which is a macrophyte biomass of the genus *Lemna*, is an aquatic macrophyte that exhibits fast growth and, hence, high production rates. For example, some duckweed has been shown to double its mass in as little as 16 hours, providing large amounts of biomass during cultivation. In warm climates, like the southeastern United States, duckweed can be harvested over short intervals for upwards of 300 days/year. Although duckweed is currently used for bioremediation in some municipal and agricultural wastewater treatment operations, further opportunities exist to expand the use of duckweed to remediate and reclaim wastewater sources, such as industrial, residential, and agricultural wastewater sources. For these reasons, duckweed may provide a high-volume source of macrophyte biomass using low-cost cultivation techniques, enabling the large scale manufacture and use of a bioplastic composition in accordance with this disclosure. That being said, although duckweed is used as a macrophyte biomass in some example bioplastic compositions, in other examples, the bioplastic composition may use other types of macrophytes, and the disclosure is not limited in this respect.

Macrophyte biomass used in the bioplastic composition can be grown and collected from any suitable growing environments. In different examples, the macrophyte biomass can be a macrophyte biomass collected from wastewater treatment ponds where the macrophyte is used for bioremediation, a macrophyte commercially grown as a source of biomass, or a macrophyte harvested in the wild (e.g., from a natural water source), where the macrophyte is typically considered a nuisance. Because macrophytes are regenerative plants, their incorporation into the bioplastic composition provides a renewable, biodegradable component to the plastic composition.

Moreover, unlike petroleum-based feedstocks which are non-renewable and increasingly expensive, macrophyte biomass is expected to be comparatively abundant and inexpensive in the future. Macrophytes are expected to be used with increasing frequency in the bioremediation of agricultural, municipal, and industrial wastewaters as well as to sequester and convert $CO_2$. As a result, macrophyte biomass from wild harvests and wastewater remediation, among other sources, may provide significant quantities of sustainable, non-petroleum-based feedstock for manufacturers and users of a bioplastic composition as described in this disclosure.

Macrophyte material harvested from an aquatic cultivation environment may be processed prior to incorporation in the bioplastic composition using a variety of techniques. In some examples, the macrophyte biomass is mechanically and/or thermally dewatered prior to incorporation in the bioplastic composition so as to dry the macrophyte biomass. For example, the macrophyte biomass may be harvested and dried to a moisture content less than 25 weight percent of the macrophyte biomass such as, e.g., a moisture content less than 15 weight percent, a moisture content less than 5 weight percent, or a moisture content less than 3 weight percent. Drying the macrophyte biomass may make the biomass easier to mill (in examples where the biomass is subsequently milled) and avoid introducing high amounts of water into the bioplastic composition. In examples in which a macrophyte biomass is dewatered prior to incorporation in a bioplastic composition, the macrophyte biomass may or may not be washed after harvesting and prior to dewatering.

In addition to or in lieu of dewatering the macrophyte biomass, the macrophyte biomass may be processed to reduce the particle size of the biomass prior to incorporation in the bioplastic composition. In different examples, the macrophyte biomass can be milled (e.g., milled in a fluidized jet bed) by crushing, grinding, and/or shearing the macrophyte biomass to reduce the size of the biomass from the cultivation size (e.g., after drying) to a desired size for incorporation in to the bioplastic composition. Milling the macrophyte biomass may increase the homogeneity of the bioplastic composition formed from the biomass and/or increase access to protein constituents in the macrophyte biomass for polymerization as compared to when larger (e.g., unmilled) macrophyte biomass particles are used.

Although the size of the macrophyte biomass may vary based on the intended use of the bioplastic composition, in some examples, the macrophyte biomass is processed so the biomass defines an average particle size less than 500 micrometer such as, e.g., less than 300 micrometer, less than 100 micrometer, less than 50, or less than 10 micrometer. In other examples, the macrophyte biomass is processed so the biomass defines an average particle size ranging from approximately 1 micrometer to approximately 500 micrometer such as, e.g., from approximately 1 micrometer to approximately 300 micrometer, or from approximately 10 micrometer to approximately 100 micrometer. Where the bioplastic composition is intended to be used to form a thin polymeric film or in other injection molding applications, for instance, the macrophyte biomass may be processed so the biomass defines an average particle size less 50 micrometer. On the other hand, in examples in which the bioplastic composition is intended to be used to form a fiber (e.g., for clothing, carpet, or the like), the macrophyte biomass may be processed so the biomass defines an average particle size less than approximately 10 micrometer (e.g., ranging from approximately 1 micrometer to approximately 10 micrometer). The foregoing particles sizes are merely examples, and macrophyte biomass defining other particle sizes may be used without departing from the scope of the disclosure.

In some examples, the macrophyte biomass is processed prior to incorporation in the bioplastic composition to change the color of the biomass. For example, the macrophyte biomass may be bleached to remove green color from the macrophyte biomass, e.g., to obtain a white or near white biomass. In addition to or in lieu of bleaching the macrophyte biomass, the biomass may be dyed to artificially the color of the biomass. The type and color of the dye used may depend on the desired characteristics of the plastic article into which the bioplastic composition is intended to be processed.

Other chemical modifications of the macrophyte biomass may or may not be performed, depending on the desired characteristics of the biomass in the bioplastic composition. For example, starch, cellulose, and/or protein may be extracted from the macrophyte biomass and/or starch in the biomass may undergo starch modification to change the chemical and physical properties of the biomass. Starch and/or protein extraction may create a high-grade biomass that exhibits improved material properties as compared to the unextracted biomass. When used, extractions can be performed by any suitable techniques, including applying a strong base to the macrophyte biomass for protein solubilization to separate starch content out as solids and/or acid precipitation of proteins for extraction. After this extraction process, protein can be used to increase raw biomass protein concentration, e.g., for specialty plastic applications like food packaging. Additionally or alternatively, the starch in the biomass can be modified for thermal plastic starch production. As another example, starch cellulose can be removed from the biomass for high value applications including nano-cellulose production.

By removing components from the macrophyte biomass, processing the components to change the chemical and/or physical properties of the components, and then introducing the modified components back into the biomass, the characteristics of the resultant biomass can be modified and enhanced. Accordingly, in some examples, a processed macrophyte biomass used in a bioplastic composition may include nano-cellulose, protein concentrates, and/or modified starch, among other components.

Although the macrophyte biomass used in the bioplastic composition can be processed to enhance the chemical and/or physical properties of the biomass, the biomass need not be processed using chemical extraction or modification techniques prior to incorporation in a bioplastic composition. Rather, the refining processes typically used to isolate biological polymers from a biomass may be eliminated because the macrophyte biomass may naturally contain proteins, starches, and cellulose fibers that provide a suitable balance of properties for direct inclusion in a bioplastic composition. This is in contrast to traditional terrestrial crop-based polymers (e.g., soy protein meal or isolate, wheat gluten, canola protein, sunflower protein, sorghum protein, corn zein, starch from corn, wheat, and potato, or other cellulosic feedstock), which usually require isolation and purification of biopolymers to form a bioplastic composition. In accordance with these examples, the macrophyte biomass can be harvested and optionally dewatered, milled, and/or color modified before being directly incorporated in a bioplastic composition. Direct use of a macrophyte biomass without chemical extraction or modification of proteins, starches, and/or cellulose fibers may provide a low-cost, environmentally-friendly feedstock for the bioplastic composition.

Independent of the specific processing steps performed on the macrophyte biomass, the chemical composition of the macrophyte biomass incorporated into the bioplastic composition may vary based on a number of different factors such as, e.g., the type of macrophyte(s) selected for incorporation into the bioplastic and the processing steps performed on the macrophyte(s) prior to incorporation into the bioplastic composition. In some examples, the macrophyte biomass exhibits a protein concentration greater than 5 weight percent of the biomass such as, e.g., greater than 10 weight percent of the biomass, greater than 25 weight percent of the biomass, or greater than 40 weight percent of the biomass. For example, the macrophyte biomass may exhibit a protein concentration ranging from approximately 10 weight percent of the biomass to approximately 80 weight percent of the biomass such as, e.g., from approximately 25 weight percent of the biomass to approximately 75 weight percent of the biomass, or from approximately 30 weight percent of the biomass to approximately 50 weight percent of the biomass. Macrophytes cultivated in high nutrient conditions such as wastewater lagoon cultivation systems, for instance, may exhibit protein concentrations as high as 45 weight percent (e.g., based on the dewatered weight of the macrophyte biomass).

In general, the natural proteins found in aquatic macrophytes exhibit a higher degree of hydrophobicity than terrestrial plant proteins. Terrestrial plant proteins generally have hygroscopic properties that lead to swelling when exposed to high moisture conditions and inhibit interaction with hydrophobic traditional polymer chains. By contrast, the native aquatic environment of macrophytes may promote the existence of hydrophobic structural proteins in the tissue that prevent the tissue from over-absorbing surrounding water. This can be useful for forming bioplastic compositions.

Many macrophytes biomass sources contain ash. The amount of ash may vary based on the type of macrophyte(s) used and processing steps performed on the biomass prior to incorporation in the bioplastic composition. Typically, reducing the amount of ash in the macrophyte biomass may improve the strength and plasticity of the bioplastic composition as the ash may function as filler that that does not impart functional properties to the bioplastic composition. Accordingly, in some examples, the macrophyte biomass used in the bioplastic composition exhibits an ash concentration less than 40 weight percent of the biomass such as, e.g., less than 30 weight percent of the biomass, less than 15 weight percent of the biomass, or less than 5 weight percent of the biomass. For example, the macrophyte biomass may exhibit an ash concentration range from 0 weight percent of the biomass to approximately 30 weight percent of the biomass such as, e.g., from approximately 2 weight percent of the biomass to approximately 20 weight percent of the biomass.

In addition to ash, many macrophyte biomass sources contain fibers, which can act as a reinforcing component in a bioplastic composition and increase the modulus values for the bioplastic composition. For example, macrophytes grown in high nutrient conditions may exhibit fiber concentrations greater than 5 weight percent of the biomass such as, e.g., greater than 10 weight percent, or greater than approximately 15 weight percent. This is in contrast to other high protein grain crops (e.g., soy, corn, wheat, etc.), which typically do not include such high fiber loadings.

Bioplastic compositions according to the present disclosure may include any suitable amount of macrophyte biomass. In some examples, the bioplastic compositions include greater than 5 weight percent macrophyte biomass such as, e.g., greater than approximately 10 weight percent macrophyte biomass, or greater than approximately 25 weight percent macrophyte biomass. For example, the bioplastic compositions may include from approximately 10 weight percent macrophyte biomass to approximately 85 weight percent macrophyte biomass such as, e.g., from approximately 15 weight percent macrophyte biomass to approximately 70 weight percent macrophyte biomass, approximately 25 weight percent macrophyte biomass to approximately 65 weight percent macrophyte biomass, or from approximately 30 weight percent macrophyte biomass to approximately 50 weight percent macrophyte biomass. The amount of macrophyte biomass included in the bioplastic composition may be based on the specific properties of the macrophyte biomass, the properties of the other components to be combined with the biomass, and the desired characteristics of the bioplastic composition.

To form a bioplastic composition, the macrophyte biomass may be combined with at least one polymer (e.g., a thermoplastic polymer) and any other desired additives. Any suitable thermoplastic polymers can be used in the bioplastic composition and the selection of specific thermoplastic polymers may depend on the performance characteristics desired of the bioplastic composition. In some examples, the polymer combined with the macrophyte biomass includes (or, optionally, consists or consists essentially of) a synthetic thermoplastic polymer. A synthetic thermoplastic polymer may be a human-made polymer (e.g., a non-naturally occurring polymer) that exhibits thermoplastic behavior.

In one example, the bioplastic composition comprises a macrophyte biomass and a thermoplastic polymer that includes (or, optionally, consists or consists essentially of) a biodegradable synthetic polymer. When combined with the macrophyte biomass which is also typically biodegradable, the resultant bioplastic composition may be fully biodegradable. The term "biodegradable" as used herein may generally refer generally to a material that can degrade from the action of naturally occurring microorganisms, such as bacteria, fungi, and algae; environmental heat; moisture; or other environmental factors. If desired, the extent of biodegradability may be determined according to ASTM Test Method D.5338.92, or ASTM G160-03.

Example biodegradable synthetic polymers may include, but are not limited to, poly-lactic acid (PLA), poly-hydroxyalkanoate (PHA), such as poly(3-hydroxybutyrate) (PHB), poly(3-hydroxybutyrate-co-4-hydroxybutyrate), poly(3-hydroxybutyrate-co-3-hydroxyvalerate (PHBV), poly(3-hydroxybutyrate-co-3-hydroxyhexanoate) (PHH), poly(3-hydroxybutyrate-co-3-hydroxyoctanoate),
polyhydroxyvalerate (PHV), thermoplastics starch (TPS), starch grafted methyl acrylate, aliphatic-aromatic co-polyester, poly(butylene succinate) (PBS), polycaprolactone (PCL) and combinations thereof.

Although biodegradable synthetic thermoplastic polymers can be used in the bioplastic composition, non-biodegradable synthetic thermoplastic polymers can also be used in the composition in addition to or in lieu of the biodegradable polymer. Any synthetic thermoplastic polymers used in traditional plastic manufacturing can be included in the bioplastic composition. Examples of such synthetic thermoplastic polymers include, but are not limited to, polyolefins (e.g., polypropylene, polyethylene), polystyrene, polyesters, polyvinyl-chloride (PVC), polybutadiene (PBD), polybutylene (PB), poly(acrylonitrile-co-butadiene-co-styrene) (ABS), polyketone (PK), thermoplastic elastomers such as polyurethane, styrene block copolymers (SBC), polysulfone (PSU), polycarbonates (PC), ethyl vinyl-acetate (EVA), polyvinyl alcohol (PVA), sodium polyacrylate (BPA), and combinations thereof. In some examples, the synthetic thermoplastic polymers exhibit a melting point ranging from approximately 75 degrees Celsius to approximately 230 degrees Celsius, although polymers having other melt characteristics can also be used.

In another example, the bioplastic composition comprises a macrophyte biomass and a thermoplastic polymer that includes (or, optionally, consists or consists essentially of) a natural thermoplastic polymer. A natural thermoplastic polymer may be a polymer that is found in naturally occurring sources and does not need to be artificially synthesized. Example natural thermoplastic polymers include, for example, starch polymers (thermoplastic starch, starch grafted methyl acrylate, etc.), cellulosic polymers (cellulose acetate (CA), cellulose acetate propionate (CAP), cellulose acetate butyrate (CAB), hydroxyethyl cellulose, etc.), protein polymers (soy protein, sunflower protein, whey protein, wheat gluten, zein, etc.), and carbohydrate polymers. For example, protein polymers that may be combined with the macrophyte biomass include albumin, collagen, blood meal, soy protein, zein, wheat gluten, whey protein, sunflower protein, algal meal, feather meal, and combinations thereof. Carbohydrate polymers that may be combined with the macrophyte biomass (e.g., in addition to or in lieu of the protein polymers or other natural polymers) include starch derived from at least one natural source (from corn, potato, wheat, sorghum, cassava, tapioca, rice), sodium alginate, carrageenan, and combinations thereof.

The thermoplastic polymers and/or the feedstocks used to form the thermoplastic polymers may or may not come from renewable sources. In general, a renewable source may be a material that can be produced or is derivable from a natural source which is periodically (e.g. daily, monthly, seasonally, annually or perennially) replenished through the actions of plants of terrestrial, aquatic, or oceanic ecosystems (e.g. agricultural crops, edible, and non-edible grasses, forest products, aquatic plants, seaweed, or algae) or microorganisms (e.g. bacteria, fungi, yeast or protists). Thermoplastic polymers from renewable sources may provide a more environmentally sustainable bioplastic composition than bioplastic compositions formed from thermoplastic polymers derived from non-renewable sources.

Bioplastic compositions according to the present disclosure may include any suitable amount of thermoplastic polymer. In some examples, the bioplastic compositions include less than 95 weight percent thermoplastic polymer such as, e.g., less than approximately 90 weight percent thermoplastic polymer, less than approximately 50 weight percent thermoplastic polymer, or less than approximately 25 weight percent thermoplastic polymer. For example, the bioplastic compositions may include from approximately 90 weight percent thermoplastic polymer to approximately 15 weight percent thermoplastic polymer such as, e.g., from approximately 85 weight percent thermoplastic polymer to approximately 30 weight percent thermoplastic polymer, approximately 75 weight percent thermoplastic polymer to approximately 35 weight percent thermoplastic polymer, or from approximately 70 weight percent thermoplastic polymer to approximately 50 weight percent thermoplastic polymer. The amount of thermoplastic polymer included in the bioplastic composition may be based on the specific properties of the thermoplastic polymer, the properties of the macrophyte biomass to be combined with the thermoplastic polymer and the desired characteristics of the bioplastic composition.

A variety of additional additives may be included in the bioplastic composition to impart various functional and structural characteristics to the composition. One additive that may be incorporated into the bioplastic composition (e.g., in addition to the macrophyte biomass and the thermoplastic polymer) is a plasticizer. Plasticizers are typically used to separate natural polymeric components and render them more processable. For example, a plasticizer may function as a denaturant and inhibit bond formation in the plastic composition that can lead to a brittle plastic. Suitable plasticizers that may be included in the bioplastic composition include, for example, polyhydric alcohol plasticizers, such as sugars (e.g., glucose, sucrose, fructose, raffinose, maltodextrose, galactose, xylose, maltose, lactose, mannose, and erythrose), sugar alcohols (e.g., erythritol, xylitol, malitol, mannitol, and sorbitol), and polyols (e.g., ethylene glycol, glycerol, propylene glycol, dipropylene glycol, butylene glycol, and hexane triol). Other suitable plasticizers that may be included in the bioplastic composition include, for example, hydrogen bond forming organic compounds which do not have hydroxyl group, including urea and urea derivatives; anhydrides of sugar alcohols such as sorbitan; animal proteins such as gelatin; vegetable proteins such as sunflower protein, soybean proteins, cotton seed proteins; and mixtures thereof. Still other examples of suitable plasticizers include, for example, phthalate esters, dimethyl and diethylsuccinate and related esters, glycerol triacetate, glycerol mono and diacetates, glycerol mono, di, and tripropionates, butanoates, stearates, lactic acid esters, citric acid esters, adipic acid esters, stearic acid esters, oleic acid esters, and other acid esters. Aliphatic carboxylic acids may also be used, such as lactic acid, maleic acid, acrylic acid, copolymers of ethylene and acrylic acid, polyethylene grafted with maleic acid, polybutadiene-co-acrylic acid, polybutadiene-co-maleic acid, polypropylene-co-acrylic acid, polypropylene-co-maleic acid, and other hydrocarbon based acids.

When used, a plasticizer may have a molecular weight less than approximately 20,000 g/mol such as, e.g., less than about 5,000 g/mol, or less than about 1,000 g/mol. In certain examples, protein specific plasticizers such as nitrogen containing amino acid specific plasticizers may be used. A plasticizer may be used in any acceptable quantities in the bioplastic composition, although the plasticizer will typically form less than 30 weight percent of the bioplastic composition such as, e.g., less than 10 weight percent of the bioplastic composition, or less than 5 weight percent of the bioplastic composition. For example, the plasticizer may range from approximately 10 weight percent of the bioplastic composition to approximately 30 weight percent of the bioplastic composition.

Another additive that may be included in the bioplastic composition is a thermosetting polymer. A thermosetting polymer may be a polymer that cross-links during application of heat and/or pressure so that the polymer becomes permanently hard and rigid once it cools. In examples in which the bioplastic composition includes a thermosetting polymer, the thermosetting polymer may range from 0 weight percent of the bioplastic composition to approximately 30 weight percent of the bioplastic composition (e.g., from approximately 5 weight percent to approximately 20 weight percent), although other amounts of thermosetting polymer may also be used.

A variety of other compatibilizers/modifiers may also be included as additives in the bioplastic composition. Such compatibilizers/modifiers may be selected to provide certain functional properties such as, e.g., enhancing hydrophilic to hydrophobic phase interactions and/or removing, concealing, or containing odors and/or adding or modifying color. For example, a modifier included in the bioplastic composition may be a time-released agent that emanates from an external surface of the bioplastic composition over time. Example time-release modifier agents include plant growth supplements such as fertilizers, nutrients, phytohormones, microorganisms, and the like. Example compatibilizers include polyolefins grafted with anhydrides or terminated with anhydrides and co-polymers with carboxylic acids (e.g., grafted maleic anhydride polyethylene, grafted maleic anhydride polypropylene, and grafted maleic anhydride ethyl vinyl acetate, as well as copolymers including carboxylic acids, such as ethylene and acrylic acid, polybutadiene-co-acrylic acid, polybutadiene-co-maleic acid, polypropylene-co-acrylic acid).

When used, the compatibilizers/modifiers may be included in the bioplastic composition in any suitable weight percentages, although the compatibilizers/modifiers will typically form less than 30 weight percent of the bioplastic composition such as, e.g., less than 10 weight percent of the bioplastic composition, or less than 5 weight percent of the bioplastic composition. For example, the compatibilizers/modifiers may range from approximately 10 weight percent of the bioplastic composition to approximately 30 weight percent of the bioplastic composition.

Independent of the specific components selected for inclusion in the bioplastic composition in addition to the macrophyte biomass, the substituent components can be combined with the macrophyte biomass using any suitable processing techniques. In some examples, the macrophyte biomass is preprocessed prior to combination with the thermoplastic polymer. For example, the macrophyte biomass may be dried, milled down to a desired particle size, and then mixed with plasticizers and/or denaturants (when used) to help ensure the biomass receives the effects of plasticizers and/or denaturants. Thereafter, the preprocessed macrophyte biomass can be combined with the thermoplastic polymer and other desired additives to form the bioplastic composition.

In one example, the macrophyte biomass (which may or may not be preprocessed) is mixed with the thermoplastic polymer (e.g., in liquid or solid form) and other additives (when used) and then processed in the presence of heat and/or pressure to form the bioplastic composition. For example, a resultant mixture of macrophyte biomass, thermoplastic polymer, and other additives can be extruded, molded, or otherwise formed into transportable pellets for subsequent delivery to plastic article manufacturers.

In one example, macrophyte biomass can be converted to a bioplastic composition using compression molding techniques. The bioplastic composition in these examples may be formed by mixing appropriate substituent ingredients and then filling the resultant mixture into a mold. A plunger may then be added to the mold and the mold apparatus put into a compression molder. The compression molder may be heated to a temperature, e.g., ranging from 300° C. to 325° C. (although other temperatures are possible) and then pressure applied to mold (e.g., a pressure of at least 40 MPa). In some examples, the mold is heated for 20 minutes then cooled back to room temperature over 10 minutes to reduce stress fracturing. Subsequently, the mold may be opened to yield a finished bioplastic composition in the mold cavity. Such a procedure may be suitable for producing small batch of the bioplastic composition.

In other examples, the macrophyte biomass can be converted to a bioplastic composition using extrusion equipment. For example, masterbatch pellets of bioplastic composition may be formed by feeding desired thermoplastic polymers and/or other additives into a main hopper of a twin screw extruder and then feeding macrophyte biomass downstream through side feeders. In the main hopper, the thermoplastic polymers may be added with appropriate fractions of compatibilizers and modifiers (when used) to form a melt flow to which a macrophyte fraction is added. Down stream in the side feeder, macrophyte biomass (which may or may not be preprocessed) can be added to proper blending ratio by weight. The finished bioplastic composition can then be extruded from a die head designed with reduced shear, cooled, and/or fed through a pelletizer using standard industry practices. In this manner, a bioplastic composition can be formed in which macrophyte biomass is homogenously admixed with thermoplastic polymers and other desired additives.

The specific operating parameters of the extrusion equipment will vary, e.g., based on the type of equipment used and the specific composition of the bioplastic. That being said, in some examples, a twin screw extruder may operate at a barrel temperature of approximately 320° F. with a RPM of approximately 270 to produce 10 lbs of pellets per minute. Cooling can be accomplished by passing strands from the extruder over cooled rollers, or by introducing strands into a water bath after extruding. Extrusion of macrophyte biomass alone may result in high torque and unstable product due to a lack of melt like characteristic of material. For this and other reasons, the macrophyte biomass may be mixed with a variety of thermoplastic polymers and other additives prior to or during extrusion, as described in this disclosure. The thermoplastic polymers and additives may aid in smooth movement of the macrophyte biomass through the extruder, among benefits, helping to reduce resistance to movement and shear that causes burning and thereby yielding an extrudable bioplastic composition.

Prior to using the bioplastic composition in the subsequent formation of a bioplastic article, the bioplastic composition (e.g., in pelletized form) may be processed by drying the composition and/or devolatilizing the composition (e.g., by heating the composition at around 80° C. for several hours under a vacuum to allow for volatiles removal). Additionally or alternatively, the bioplastic composition can be blended with other materials (resins, color modifiers, etc.) before being added to machinery for final processing into bioplastic articles. The final product processing may follow common industry practices for plastic article machines, since the bioplastic composition produced may function as a "drop in" product for standard plastic article manufacturing machines.

Macrophyte-based bioplastic compositions in accordance with examples of the disclosure can have a number of different formulations. In some examples, the bioplastic compositions include (or, optionally, consist or consist essentially of) macrophyte biomass ranging from approximately 10 weight percent to approximately 85 weight percent, and/or plasticizer ranging from 0 weight percent to approximately 30 weight percent, and/or natural polymers ranging from approximately 10 weight percent to approximately 85 weight percent, and/or synthetic polymers ranging from approximately 10 weight percent to approximately 85 weight percent, and/or compatibilizers/modifiers ranging from approximately 1 weight percent to approximately 15 weight percent and/or a thermoset polymer (e.g., resin) ranging from 0 weight percent to approximately 30 weight percent. These compositions may be generated over the length of the processing parameters previously described with components being added at a variety of different steps to ultimately yield a desired bioplastic composition. In some examples, the bioplastic composition exhibits a melting point temperature ($T_m$) ranging from approximately 75° C. to approximately 180° C.

A bioplastic composition in accordance with the present disclosure can be formed into numerous end-use plastic articles using any suitable techniques including, e.g., compression molding, compounding, and injection molding. Example articles that can be formed from the bioplastic composition include pellets, plastic films (e.g., for food or other packaging) such as thin plastic films with thicknesses ranging from 5 micrometers to 300 micrometers, fibers (e.g., for clothing, carpets, carpet backings), agricultural mulch films, injection molded articles, containers parts, implements, coatings, adhesives, absorbents, non-woven materials, and the like. For example, to form a fiber, the bioplastic composition may be melt flowed and extruded through a fiber-making die head. Such fibers may be used as carpet fibers for weaving a carpet, diper filling, etc. As another example, the bioplastic composition may be used as a coating or adhesive. Such a coating or adhesive may be water soluble and may be used for food packaging. Independent of the specific end use of the bioplastic composition, in some examples, the bioplastic composition is formed entirely of non-toxic biodegradable materials. This may enable the fabrication of a plastic article/coating/adhesive or the like that is entirely non-toxic and biodegradable. The bioplastic composition may enable common thermoplastic processing techniques to be applied to macrophyte materials, allowing for the development of usable bioplastic materials for a wide array of consumer needs from agribusiness, to packaging and home use applications.

The following examples may provide additional details about a macrophyte biomaterial formed in accordance with this disclosure.

EXAMPLE MATERIALS

Three types of macrophyte biomass were collected to produce a bioplastic composition. The macrophyte biomass were wild harvested from wastewater treatment lagoons and natural habitats. Specifically, the three types of macrophyte biomass were duckweed, water lettuce, and *salvinia*. A fourth sample of watermilfoil was also tested, but the particular sample did not polymerize. It is speculated that this was caused by excess quantities of ash in the macrophyte biomass, which may interfere with proper polymerization of the matrix.

Figure 1:
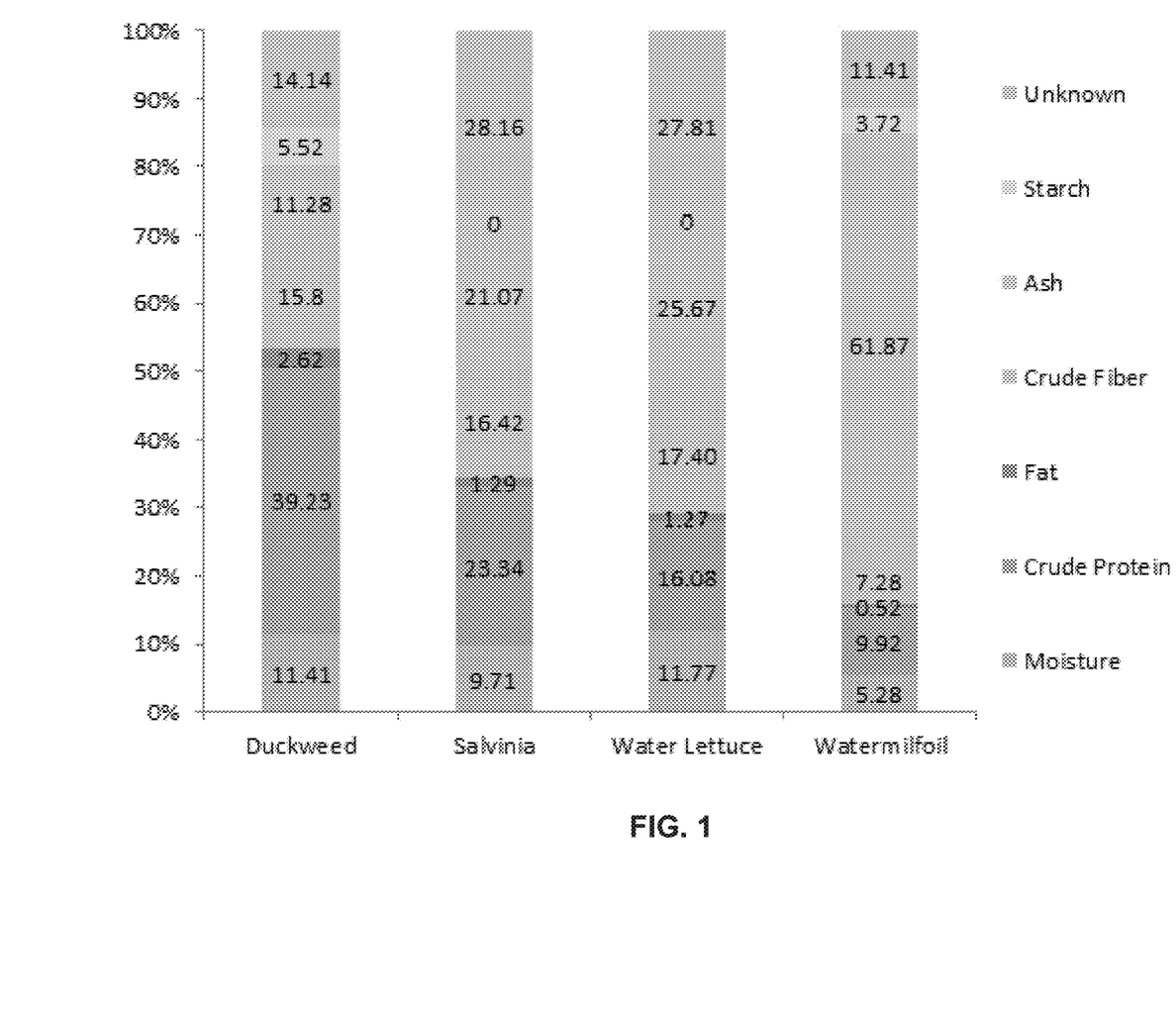
FIG. 1 shows example compositional data from three example macrophytes samples tested.

The three macrophyte biomass samples were all extracted from fresh water habitats (some saltwater macrophytes may have excess ash, preventing proper polymerization). The duckweed was harvested from a wastewater treatment lagoon under high nutrient conditions. The water lettuce and *salvinia* from low nutrient wild conditions. Once harvested, all three macrophyte samplers were milled to 250 micrometers. However, after testing, the duckweed sample was further milled down to a particle size ranging from approximately 50 micrometers to approximately 5 micrometers. Compositional data for example macrophyte samples are shown in FIG. 1.

The macrophyte biomass samples were combined with a variety of different thermoplastic materials. The thermoplastic materials had the characteristics reported below.

The polyethylene was ultra high molecular weight polyethylene obtained from Sigma Aldrich (St. Louis, Mo.). The polyethylene is reported to have a density of 0.94 g/mL at 25° C., a melting point at 144° C., and a particle size of 53-75 μm.

The LLDPE was either LL 2420 or LL 1500 distributed by Plastic Solutions (Roswell, Ga.). LL 2420 had a melt flow rate of about 20 g/10 min, and a density of 0.924 g/mL. LL 1500 had a melt flow rate of about 150 g/10 min, and a density of 0.932 g/L.

The EVA was EVATANE 28-150 produced by Arkema (Colombes Cedex, France). Evatane 28-150 had a vinyl acetate content of 27-29% by weight, a melt index of 135-175 g/10 min, a density of 0.93 g/mL, and a melting point of 69° C.

The PLA was either Cereplast (Hawthorne, Calif.) Compostable 1010 or Natureworks Biopolymer 3251D. Compostable 1010 had a melt index of 5 g/10 min, and a density of 1.31 g/mL. Biopolymer 3251D had a melt index of 70-85 g/10 min, and a density of 1.24 g/mL.

EXAMPLE PROCESSING CONDITIONS

The macrophyte biomass samples were compression molded with the thermoplastic polymers using a Carver 3850 heated press (Wabash, Ind.) with custom designed dogbone and DMA flexbar molds. The macrophyte biomass samples were combined with glycerol as a plasticizer in a beaker, and then the mixture was added to the mold cavity. The mold was then placed on a press which was preheated to between 300° F.-325° F. and a pressure was applied to exceed at least 40 MPa. The sample was then cooked under pressure for 20 minutes, and then was subsequently cooled for 10 minutes under pressure. Quantities of glycerol were varied from 10 wt % to 30 wt % at intervals of 5% to determine the impact of the ratio of plasticizer to macrophyte biomass.

Figure 2:
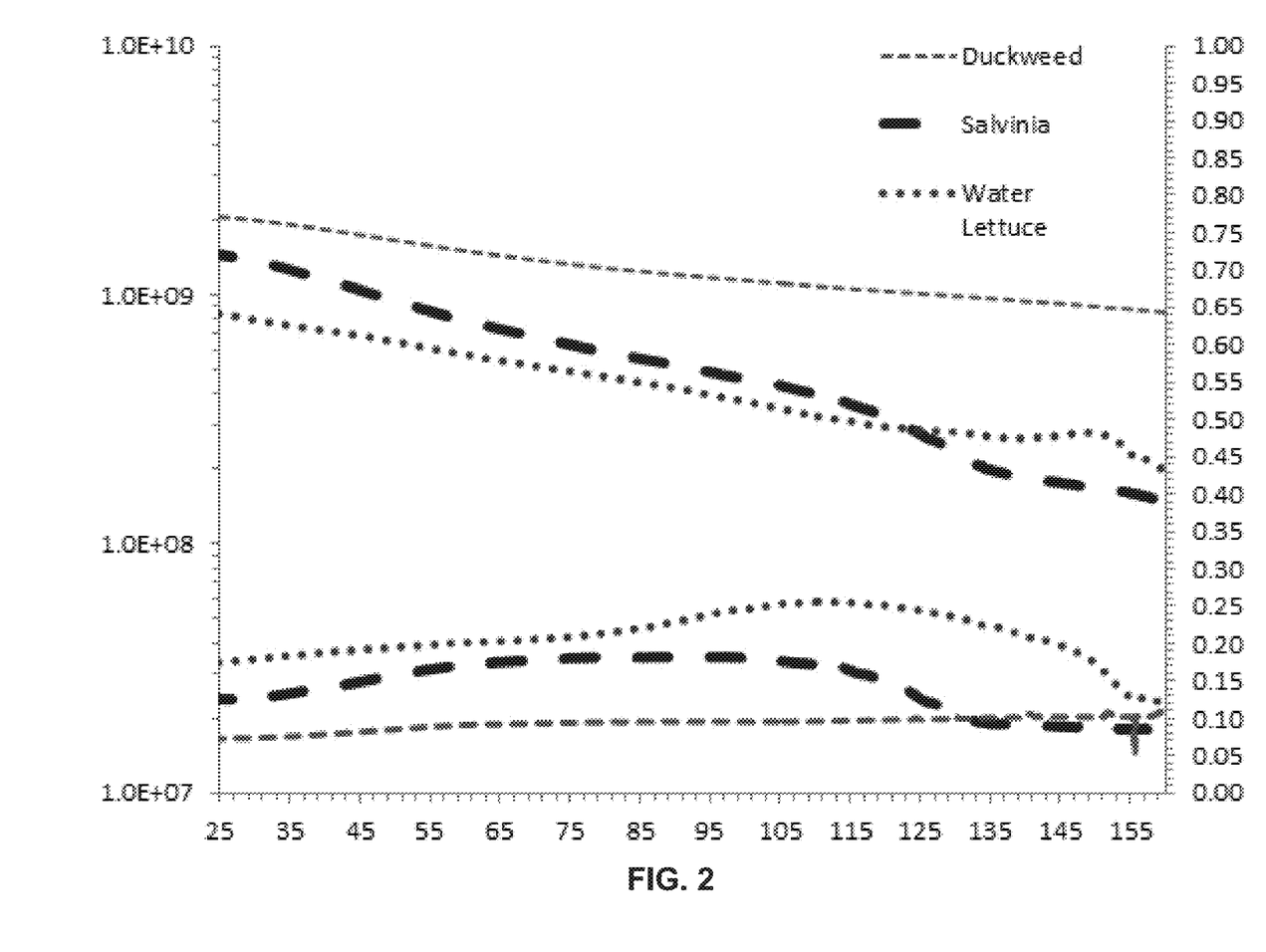
FIG. 2 shows the results from Dynamic Mechanical Analysis for sample containing 100% macrophyte biomass with no additional base resin or plasticizers.
Figure 3:
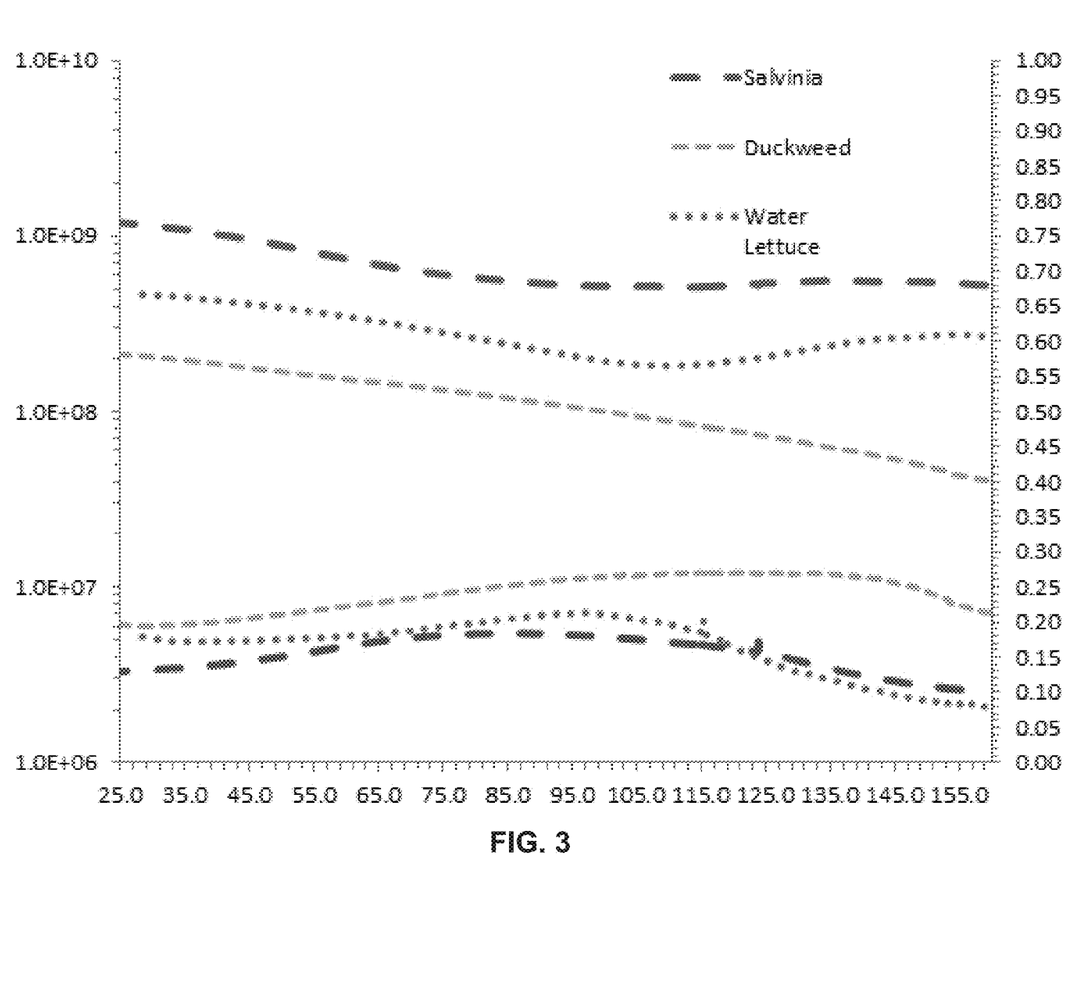
FIG. 3 shows the results from Dynamic Mechanical Analysis for a sample containing 80% macrophyte biomass with 20% glycerol plasticizer.

FIGS. 2 and 3 illustrate example results for 100% macrophyte and 80%/20% blends from Dynamic Mechanical Analysis. In FIG. 2, the top lines are modulus values in MPa and correspond to the left axis; the bottom lines are Tan Δ values and correspond to the right axis. In FIG. 3, the top lines are modulus values in MPa and correspond to the left axis; the bottom lines are Tan Δ values and correspond to the right axis.

With these samples, duckweed is most affected by the plasticization due to the higher protein content and lower ash. Duckweed demonstrates the highest initial modulus and lowest initial Tan Δ, but has the lowest modulus after plasticization, and the highest Tan Δ. This polymeric characteristic of softening and becoming more elastic after plasticization is also seen in *salvinia* and water lettuce but to a lesser extent. *Salvinia* and water lettuce demonstrate lower modulus and higher general Tan Δ, but not the higher peak Tan Δ as is shown with duckweed. The *salvinia* and water lettuce do, however, show a left shifted peak Tan Δ, which is another consequence of plasticization. The duckweed used in the samples may be representative of protein rich, low ash macrophyte biomasses that may be found in wastewater treatment controlled lagoon growth scenarios.

In another test, duckweed was blended with HPPE to evaluate if the macrophyte biomass could be suitably blended with polyolefins. The resulting bioplastic composition was then tested to evaluate the mechanical properties of the bioplastic composition. Blending was accomplished by producing plasticized duckweed as described above (i.e., compression molding duckweed with glycerol) and then adding HPPE to the mixture until the desired mixing ratios were reached.

Figure 4:
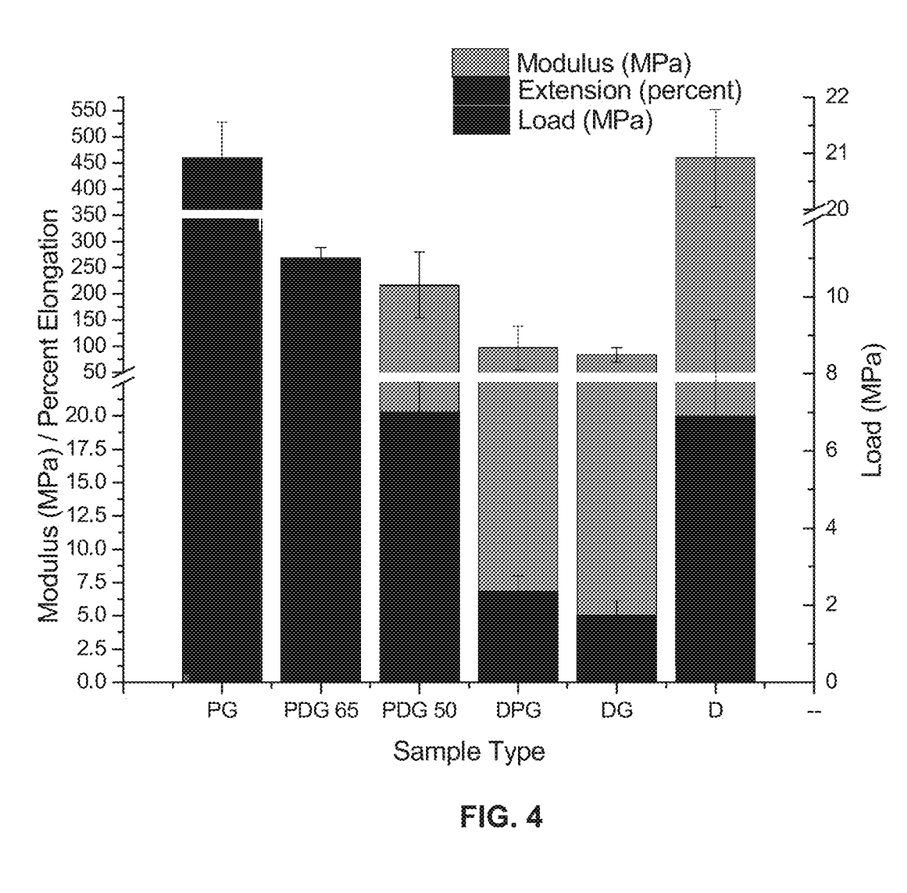
FIG. 4 shows example tensile properties for example duckweed bioplastic blends.

Example tensile properties for select duckweed bioplastic compositions are displayed in FIG. 4 and include percent elongation at peak load, max load, and modulus data. The data collected include the top three polyethylene/duckweed bioplastic compositions, a plasticized duckweed material with 20-25 wt % plasticizer, a raw duckweed material, and a pure polyethylene with glycerol material. Collected modulus values for 50% PE/50% plasticized duckweed are higher than the general trend, which is theorized to be due to phase continuity in polyethylene and bio-based phase. Also, in observing the results, it seems that there is a general trend in percent elongation until 65% PE/35% bio-based blend in which there is a rise in properties. This trend which is consistent until the 65% PE/35% bio-based blend demonstrates that 50% PE/50% bio-based likely still has protein phase continuity. Conversely, in observing load increase in 50% PE/50% bio-based, the increase in load as compared to previous trend of increase may indicate that the 50% PE/50% bio-based is different. This combination of trends therefore may indicate the dual phase continuity previously discussed and may show that protein phase is more useful for determining percent elongation characteristics, and polyethylene more dominant in determining load characteristics. Overall, increasing polyethylene increased material properties, except in case of the 50% PE/50% bio-based blend's modulus, which was higher than 65% PE/35% bio-based blend's modulus.

Figure 5A:
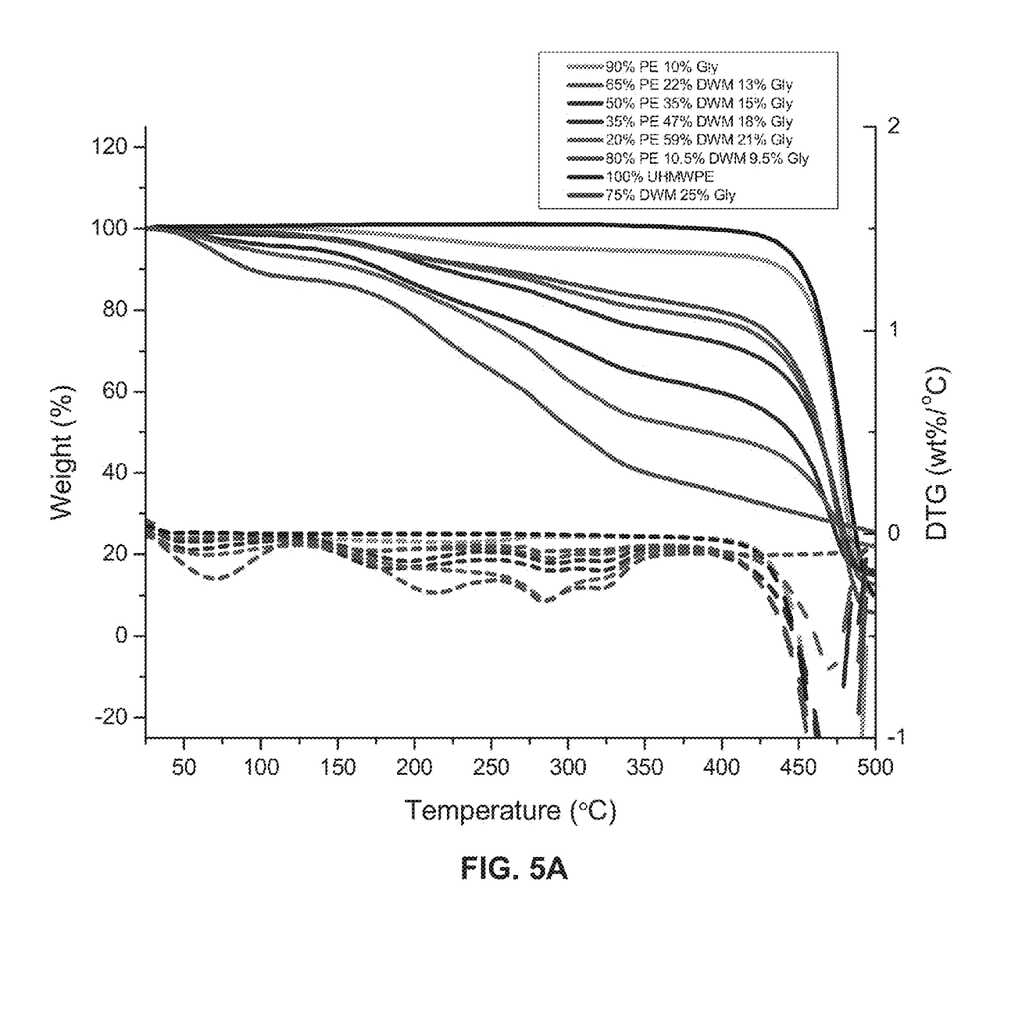
FIGS. 5A and 5B show thermal gravimetric analysis and differential scanning calorimetry, respectively, of example duckweed blends with example synthetic polymer base resins.

Example TGA results for the blends are shown in FIG. 5, which helps highlight a stabilization of the duckweed when blended with UHMWPE. Water absorption in this example is reduced since the water degradation peak at about 75° C. is lower. This is probably due to the hydrophobic nature of polyethylene which limits water's access to duckweed material in matrix. Furthermore, glycerol degradation is virtually eliminated as well with increasing polyethylene content, which may be the result of polyethylene promoting protein denaturation leading to more interaction with glycerol. Polyethylene may promote protein denaturation by providing faster heating across the sample by increasing thermal diffusivity of matrix. The thermal diffusivity values in the matrix include glycerol (0.09 mm$^2$/s), water (0.14 mm$^2$/s), biomass (closest relative in literature is low density softwood 0.17 mm$^2$/s), and polyethylene (0.2 mm$^2$/s), meaning that the polyethylene may increase the thermal diffusivity of the material and thereby increase heat transfer across material. This increased heat transfer may lead to more protein denaturation and more glycerol utilization, which might stabilize glycerol resulting in the drop in degradation in the glycerol range. The next two peaks both show incremental reduction in degradation that may correspond to biomass constituting smaller and smaller quantities of the formulation, except in the case of the carbohydrate degradation at 285° C. with 20% PE/80% bio-based sample. However, this may be due to a decrease in homogeneity that increased the presence of the material degraded at this temperature. The last of the peaks in the duckweed plastics at 450° C. is potentially still present in blends; however, polyethylene begins to degrade at this point making this peak hidden under the large polyethylene degradation peak. Overall, it appears that blending DWM with polyethylene even in smaller quantities can increase temperature stability up until polyethylene degradation at 475° C., after which the samples degrade comparatively fast.

Figure 5B:
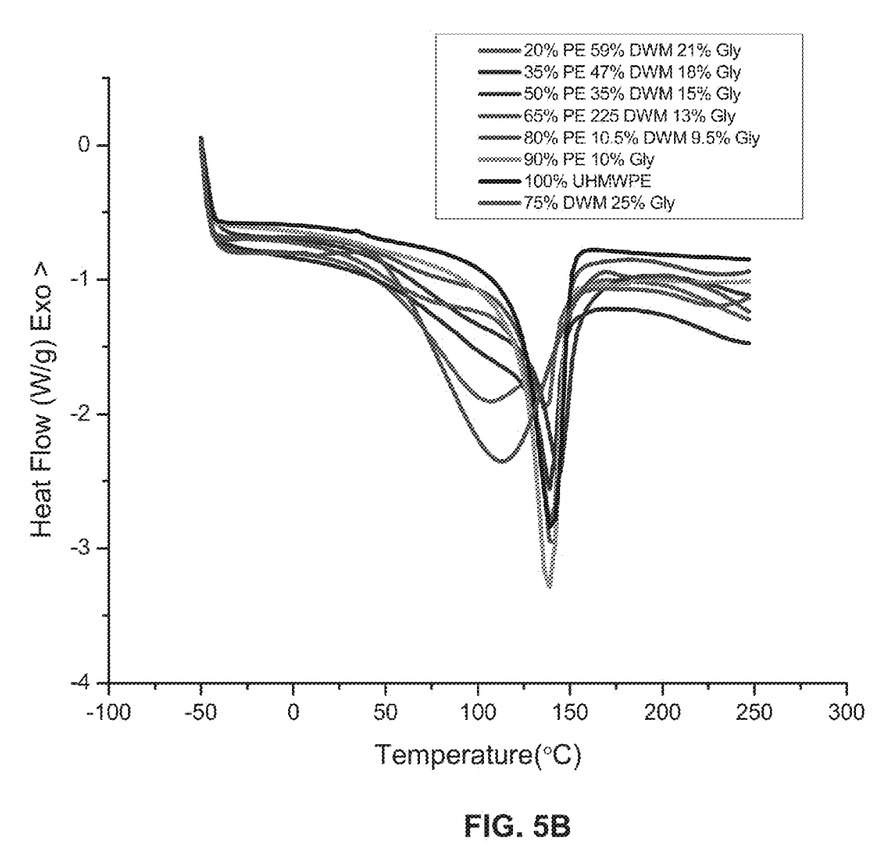

DSC results for blends shown in FIG. 5 give temperature stability information regarding duckweed blends produced in the examples. Bound water in the samples appears to be largely eliminated as the polyethylene ratio increases because the peak at around 120° C. is seen to decrease. Furthermore, melting of the polyethylene phase is seen to start at about 120° C. and peak at about 138° C., which may mean that these blends would not be good for use above approximately 115° C. to prevent risk of melting. Overall, the blends appear to possess much better water stability than protein plastic counterparts, as well as exhibiting improved thermal stabilization effects.

Notably, the plasticization of the duckweed in the samples lowers the load and raises elongation, as is expected when dealing with protein based polymeric materials. However, it should be pointed out that the elongation increases in these examples were not as dramatic as can be seen in some more pure protein plastic materials, which is likely the result of impurities inhibiting slip and hold characteristics in polymer matrix.

In Table 1 below, duckweed bioplastics are compared to other bioplastic examples from the literature that have a similar formulation. From this comparison, it can be seen that pure duckweed plastics are somewhat similar to soy protein isolate and feather meal plastics in the literature. However, when plasticized, duckweed plastics do not exhibit the extreme increases in elongation that other bioplastics exhibit. However, the samples do show similar decreases in tensile strength. This lack of exponential elongation gains that is experienced by other materials but not by duckweed may be the result of the raw nature of the duckweed material used. While other samples in literature use purified protein or starch constituents, the duckweed in the samples was utilized in its raw milled state. This likely inhibits protein polymer chains from interacting well when plasticized and therefore doesn't lead to the positive elongation gains from plasticization.

TABLE 1

Mechanical Data Comparison of Duckweed to Other Common Bioplastic Materials Comparative Analysis of Duckweed to Other Bioplastic Materials

| Bioplastic Type | Percent Elongation | Load (MPa) |
|---|---|---|
| Plasticized Wheat Gluten/Starch | 169 | 1.7 |
| Plasticized Wheat Gluten | 132.8 | 1.7 | essary. This is done to prevent burning of the macrophyte biomass due to excess shear or residence time, e.g., by introducing biomass to established melt flow downstream. Extrusion parameters used for individual examples are shown in Table 2 below, with all trials successfully yielding a strand with sufficient strength to be cooled and pelletized. Cooling was performed by running the strand through cooled rollers to solidify, followed by running a hot but not melted strand along a conveyor with fan cooling. The strand was then fed into a pelletizer to be converted into pellets for conversion into usable products for testing and prototyping. Some extrusion trials were selected for further testing including Melt Flow Indexing (MFI), tensile strength, elongation, melting point, and water absorption.

TABLE 2

Extrusion Parameters for Duckweed with Various Traditional Resin Types

| Material Blend | Feed Rate | Melt Pressure | Torque Percent | Extruder RPM | Melt Temp | Zone 1 Temp | Zone 2 Temp | Zone 3 Temp | Zone 4 Temp | Zone 5 Temp | Die Temp |
|---|---|---|---|---|---|---|---|---|---|---|---|
| 50 LLDPE/ 30 Duckweed/ 20 Glycerin | 10 lbs/hr | 80 | 23 | 272 | 321 | 320 | 321 | 317 | 306 | 301 | 315 |
| 40 LLDPE/ 40 Duckweed/ 20 Glycerin | 10 lbs/hr | 110 | 26 | 273 | 322 | 319 | 318 | 314 | 307 | 300 | 315 |
| 50 PLA/35 Duckweed/ 15 Glycerin | 8 lbs/hr | — | 40 | 218 | — | 349 | 339 | 338 | 345 | 348 | 348 |
| 47 LLDPE/3 Epolene/30 Duckweed/ 20 Glycerin | 8 lbs/hr | — | 23 | 156 | — | 316 | 320 | 318 | 296 | 311 | 302 |
| 50 EVA/35 Duckweed/ 15 Glycerin | 10 lbs/hr | — | 31 | 166 | — | 220 | 238 | 238 | 226 | 221 | 209 |
| 50 PLA/50 Duckweed | 10 lbs/hr | — | 38 | 187 | — | 285 | 342 | 348 | 343 | 344 | 349 |
| 35 LLDPE/ 15 EVA/50 Duckweed | 10 lbs/hr | — | 33 | 187 | — | 317 | 320 | 319 | 321 | 304 | 292 |

TABLE 1-continued

Mechanical Data Comparison of Duckweed to Other Common Bioplastic Materials Comparative Analysis of Duckweed to Other Bioplastic Materials

| Bioplastic Type | Percent Elongation | Load (MPa) |
|---|---|---|
| Zein | 8.5 | 25.3 |
| Plasticized Egg White Albumen/ Corn Starch | 50 | 5 |
| Plasticized Egg White Albumen/ Potato Starch | 35 | 4.25 |
| Feather Meal | 1.4 | 9.2 |
| Soy Protein Isolate | 1.2 | 13.0 |
| Duckweed | 2.09 | 6.89 |
| Plasticized Duckweed | 3.40 | 1.74 |

(Materials labeled as plasticized have some concentration of glycerol, and all materials are compression molded bioplastics in either a thick film or dogbone format)

After demonstrating duckweed's effectiveness at blending with traditional polyolefin polymers, extrusion trials were run. Extrusion was conducted on a 21 mm Theysohn TSK (Klosterneuburg, Austria) at the Polymer Centers of Excellence (Charlotte, N.C.). Thermoplastic polymer was added into primary gravimetric feed along with dry blended compatibilizers, and macrophyte biomass was added into side gravimetric feed along with blended plasticizers when nec- Detailed analyses of the material properties were conducted using ASTM standard practices (ASTM D 638 and ASTM D 1238), and are shown in Table 3. Measurements were taken from dogbones produced by injection molding into an ASTM Type I tensile bar mold, with the exception of MFI, which was conducted with pellets. MFI was tested using Melt Indexer MI-4 from Goettfert (Rock Hill, S.C.), water absorption was tested using simple weight change measurements, and tensile test were conducted using an Instron 3343 (Grove City, Pa.). Compatibilized polyethylene composites in these particular samples showed the best strength and lowest water absorption, but EVA composites showed the highest elongation. Polyethylene and EVA mix was used for further injection molding tests which demonstrated the ability to form a three dimensional box container for packaging applications. The injection molding parameters used for 35% LLDPE, 15% Evatane, 50% Duckweed were: Nozzle temp 350, Injection speed 1.5 in/s, Injection pressure 7500 psi, hold pressure 6500 psi, hold time 18 sec, back pressure 250 psi, screw speed 50%, cycle time 42.5 sec, cooling time 20 sec, fill time 0.64 sec, and clamping tonnage 75 tons. The injection molding was conducted on a 165 ton Engel Injection Molder at Polymer Centers of Excellence (Charlotte, N.C.).

TABLE 3

Material Properties for Select Duckweed Composite Formulations

| Resin | Formulation | Molding Process | MFI | Tensile Strength | Percent Elongation | Melting Point | Water Absorption |
|---|---|---|---|---|---|---|---|
| LL-2420/DWM/Gly | 50/30/20 | TSE | 15 | — | — | — | — |
| LL-1500/Evatane/DWM | 35/15/50 | IM | 37 | 4.8 MPa | 3% | 127 | — |
| LL-1500/DWM/Gly/Epolene | 32/50/15/3 | IM | 25 | 8.0 MPa | 7% | 127 | 4% |
| Evatane/DWM/Gly | 35/50/15 | IM | 28 | 1.9 MPa | 20% | 70 | 14% |
| PLA/DWM | 50/50 | IM | — | 22.9 MPa | 2% | — | — |

The present invention has been described both in general and in detail by way of examples. Persons skilled in the art will understand that the invention is not limited necessarily to the specific embodiments disclosed. Modifications and variations may be made without departing from the scope of the invention as defined by the following claims or their equivalents, including equivalent components presently known, or to be developed, which may be used within the scope of the present invention. Hence, unless changes otherwise depart from the scope of the invention, the changes should be construed as being included herein.

The invention claimed is:

1. A bioplastic composition comprising:
a macrophyte biomass; and
a thermoplastic polymer,
wherein the macrophyte biomass comprises greater than 5 weight percent of the bioplastic composition and the thermoplastic polymer comprises less than 95 weight percent of the bioplastic composition and wherein the macrophyte biomass further comprises protein ranging from approximately 10 weight percent or greater of the macrophyte biomass.

2. The bioplastic composition of claim 1, wherein macrophyte biomass comprises a macrophyte biomass within the genus selected from the group consisting of: *Lemna, Spirodela, Woljfia, Wolfiella, Azolla, Salvinia, Myriophyllum, Eichhornia, Hydrilla, Nymphaea, Nymphoides, Elodea, Ceratophyllum, Najas, Potamogeton, Nuphar, Justicia, Sagitta ria, Orontium*, and *Pistia*.

3. The bioplastic composition of claim 1, wherein the macrophyte biomass comprises protein ranging from approximately 10 weight percent to approximately 80 weight percent of the macrophyte biomass and ash ranging from 0 weight percent to approximately 30 weight percent of the macrophyte biomass.

4. The bioplastic composition of claim 3, wherein the macrophyte biomass is at least one of duckweed, water fern, water lettuce, water hyacinth, water milfoil, pond weed, southern naiad, water weeds, hom wort, water lily, pond lily, water willow, broadleaf arrowhead, orontium, and hydrilla.

5. The bioplastic composition of claim 1, wherein the macrophyte biomass has particle sizes ranging from approximately 1 micrometer to approximately 300 micrometer.

6. The bioplastic composition of claim 1, wherein the thermoplastic polymer comprises a synthetic thermoplastic polymer.

7. The bioplastic composition of claim 6, wherein the synthetic thermoplastic polymer comprises a biodegradable synthetic thermoplastic polymer.

8. The bioplastic composition of claim 7, wherein the biodegradable synthetic thermoplastic polymer comprises at least one of polylactic acid (PLA), polyhydroxyalkanote (PHA), poly-3-hydroxybutyrate (PHB), polyhydroxyhexanoate (PHH), polyhydroxyvalerate (PHV), thermoplastics starch (TPS), and starch grafted methyl acrylate.

9. The bioplastic composition of claim 6, wherein the synthetic thermoplastic polymer comprises at least one of a polyolefin, polystyrene, polyesters, polyvinyl-chloride (PVC), polybutadiene (PBD), polybutylene (PB), poly(acrylonitrile-co-butadiene-co-styrene) (ABS), polyketone (PK), polyurethane, styrene block copolymers (SBC), polysulfone (PSU), polycarbonates (PC), ethyl vinyl-acetate (EVA), polyvinyl alcohol (PV A), and sodium polyacrylate (BPA).

10. The bioplastic composition of claim 1, wherein the thermoplastic polymer comprises a natural thermoplastic polymer.

11. The bioplastic composition of claim 10, wherein the natural thermoplastic polymer comprises protein polymers and carbohydrate polymers.

12. The bioplastic composition of claim 11, wherein the protein polymers comprise at least one of albumin, collagen, blood meal, soy protein, zein, wheat gluten, whey protein, sunflower protein, algal meal and feather meal.

13. The bioplastic composition of claim 11, wherein the carbohydrate polymers comprise at least one of a starch from a natural source, sodium alginate, carrageenan, cellulose acetate (CA), cellulose acetate propionate (CAP), and cellulose acetate butyrate (CAB).

14. The bioplastic composition of claim 1, further comprising a plasticizer.

15. The bioplastic composition of claim 14, wherein the plasticizer is at least one of water, urea, latex, a polyol, a polyhydric alcohol, a sugar alcohol, a butanoate, a stearate, glycerol triacetate, glycerol mono acetate, glycerol diacetates, glycerol monopropionate, glycerol dipropionate, glycerol tripropionate, a phthalate ester, dimethylsuccinate, diethylsuccinate, and an acid ester.

16. The bioplastic composition of claim 1, further comprising a compatibilizer.

17. The bioplastic composition of claim 16, wherein the compatibilizer is at least one of a polyolefin grafted with anhydrides or terminated with anhydrides, and a co-polymer with carboxylic acids.

18. The bioplastic composition of claim 1, further comprising a thermoset polymer comprising less than approximately 30 weight percent of the bioplastic composition.

19. The bioplastic composition of claim 18, wherein the thermoset polymer is at least one of an epoxy, polyurethane, polyisocyanurate, methylene diphenyl diiscocyanate, melamine formaldehyde, phenol-formaldehyde, urea-formaldehyde, silicone, vinyl ester and epoxidized vegetable oil.

20. The bioplastic composition of claim 1, wherein the macrophyte biomass ranges from approximately 10 weight percent to approximately 85 weight percent of the bioplastic composition, and the thermoplastic polymer ranges from approximately 90 weight percent to approximately 15 weight percent of the bioplastic composition.

21. The bioplastic composition of claim 1, wherein the bioplastic composition is in the shape of at least one of a pellet, a film, and a fiber.

22. A bioplastic composition consisting essentially of:
a macrophyte biomass ranging from approximately 10 weight percent to approximately 85 weight percent of the bioplastic composition; and
a thermoplastic polymer ranging from approximately 90 weight percent to approximately 15 weight percent of the bioplastic composition,
wherein the macrophyte biomass has particle sizes ranging from approximately 1 micrometer to approximately 300 micrometers, wherein the macrophyte biomass is homogenously admixed with the thermoplastic polymer, and wherein the macrophyte biomass further comprises protein ranging from approximately 10 weight percent or greater of the macrophyte biomass.

23. The bioplastic composition of claim 22, wherein the macrophyte biomass ranges from approximately 25 weight percent to approximately 65 weight percent of the bioplastic composition, and the thermoplastic polymer ranges from approximately 75 weight percent to approximately 35 weight percent of the bioplastic composition.

24. The bioplastic composition of claim 22, wherein the macrophyte biomass comprises at least one of duckweed, water fern, water lettuce, water hyacinth, water milfoil, pond weed, southern naiad, water weeds, horn wort, water lily, pond lily, water willow, broadleaf arrowhead, orontium, and hydrilla.

25. A method comprising:
mixing a macrophyte biomass with a thermoplastic polymer to form a bioplastic composition, and wherein the macrophyte biomass further comprises protein ranging from approximately 10 weight percent or greater of the macrophyte biomass,
wherein mixing the macrophyte biomass with the thermoplastic polymer comprises mixing an amount of macrophyte biomass with an amount of thermoplastic polymer so that the macrophyte biomass comprises greater than 5 weight percent of the bioplastic composition and the thermoplastic polymer comprises less than 95 weight percent of the bioplastic composition.

26. The method of claim 25, wherein macrophyte biomass comprises a macrophyte biomass within the genus selected from the group consisting of: *Lemna, Spirodela, Wolfia, Wolfiella, Azolla, Salvinia, Myriophyllum, Eichhornia, Hydrilla, Nymphaea, Nymphoides, Elodea, Ceratophyllum, Najas, Potamogeton, Nuphar, Justicia, Sagitta ria, Orontium,* and *Pistia.*

27. The method of claim 25, wherein the macrophyte biomass is at least one of duckweed, water fern, water lettuce, water hyacinth, water milfoil, pond weed, southern naiad, water weeds, horn wort, water lily, pond lily, water willow, broadleaf arrowhead, orontium, and hydrilla.

28. The method of claim 25, further comprising processing the macrophyte biomass so that the macrophyte biomass has particle sizes ranging from approximately 1 micrometer to approximately 300 micrometers.

29. The method of claim 25, wherein the thermoplastic polymer comprises at least one of a natural thermoplastic polymer that includes protein polymers and carbohydrate polymers and a synthetic polymer.

30. The method of claim 25, further comprising harvesting the macrophyte biomass from an aquatic culture, dewatering, drying, and milling the macrophyte biomass.

31. The method of claim 25, further comprising forming the bioplastic composition into pellets.

32. The method of claim 25, wherein mixing the macrophyte biomass with the thermoplastic polymer comprises mixing the amount of macrophyte biomass with the amount of thermoplastic polymer so that the macrophyte biomass comprises from approximately 25 weight percent to approximately 65 weight percent of the bioplastic composition and the thermoplastic polymer ranges from approximately 75 weight percent to approximately 35 weight percent of the bioplastic composition.

33. A method comprising:
forming an article from a bioplastic composition,
wherein the bioplastic composition comprises a macrophyte biomass and a thermoplastic polymer,
wherein the macrophyte biomass further comprises protein ranging from approximately 10 weight percent or greater of the macrophyte biomass, and
wherein the macrophyte biomass comprises greater than 5 weight percent of the bioplastic composition, and the thermoplastic polymer comprises less than 95 weight percent of the bioplastic composition.

34. The method of claim 33, wherein the macrophyte biomass ranges from approximately 10 weight percent to approximately 85 weight percent of the bioplastic composition, the thermoplastic polymer ranging from approximately 90 weight percent to approximately 15 weight percent of the bioplastic composition, the macrophyte biomass has particle sizes ranging from approximately 1 micrometer to approximately 300 micrometers, and the macrophyte biomass is homogenously admixed with the thermoplastic polymer.

35. The method of claim 33, wherein forming the article comprises heating the bioplastic composition to provide a hot bioplastic composition, filling a mold with the hot bioplastic composition, allowing the hot bioplastic composition to cool inside the mold, and opening the mold.

36. The method of claim 33, wherein forming the article comprises extruding the bioplastic composition through a die head to form the article.

* * * * *